United States Patent [19]

Gherardi

[11] Patent Number: 4,943,985

[45] Date of Patent: Jul. 24, 1990

[54] FRAME SYNCHRONIZATION DEVICE FOR A SYNCHRONOUS DIGITAL BIT STREAM DIVIDED INTO BLOCKS BY MEANS OF A BLOCK CODE AND STRUCTURED IN FRAMES

[75] Inventor: Bernard Gherardi, Lisses, France

[73] Assignee: Societe Anonyme dite: Alcatel CIT, Paris, France

[21] Appl. No.: 353,367

[22] Filed: May 17, 1989

[30] Foreign Application Priority Data

May 18, 1988 [FR] France ................ 88 06642

[51] Int. Cl.$^5$ .......................................... H04L 7/08
[52] U.S. Cl. .................................... 375/111; 375/114
[58] Field of Search ............. 375/108, 120, 114, 116, 375/118, 106, 111; 370/105, 82, 100.1, 105.1, 105.2; 371/47.1

[56] References Cited

U.S. PATENT DOCUMENTS

| | | | |
|---|---|---|---|
| 3,641,274 | 2/1972 | Sasaki et al. ................ | 370/105.1 |
| 4,107,608 | 8/1978 | Saburi ........................... | 370/105.1 |
| 4,641,326 | 2/1987 | Tomisawa ..................... | 375/108 |
| 4,811,367 | 3/1989 | Tajika ............................ | 375/108 |
| 4,829,518 | 5/1989 | Iguchi et al. .................. | 370/100.1 |

Primary Examiner—Benedict V. Safourek
Assistant Examiner—Marianne Huseman
Attorney, Agent, or Firm—Sughrue, Mion, Zinn, Macpeak & Seas

[57] ABSTRACT

A frame synchronization device for a synchronous digital bit stream divided into blocks by means of a block code and structured in frames comprises a frame alignment word configuration recognition circuit generating for each recognized configuration a recognition signal that is directed to a frame alignment acquisition control circuit through the intermediary of a configuration selection circuit. This circuit operates under the control of a time window definition circuit driven by a block timebase and a frame timebase and is adapted to select only recognition signals corresponding to alignment word configurations correctly placed relative to the blocks. The sorting done by the configuration selector eliminates most imitation alignment words and therefore accelerates significantly the synchronization process.

2 Claims, 2 Drawing Sheets

FAW CONFIG RECOGNITION CIRCUIT

F ALG ACQUISITION CONTROL CIRCUIT

FRAME SYNCHRONIZATION DEVICE FOR A SYNCHRONOUS DIGITAL BIT STREAM DIVIDED INTO BLOCKS BY MEANS OF A BLOCK CODE AND STRUCTURED IN FRAMES

BACKGROUND OF THE INVENTION

1. Field of the Invention

Time-division multiplex synchronous digital transmission signals generally use a frame structure marked by alignment words enabling location of the data at the receiving end and transmission codes which include block codes introducing some degree of redundancy to facilitate timing recovery and transmission error detection and adapting the form of the signals to the characteristics of the transmission channels.

2. Description of the prior art

The use of a block code requires division of the digital bit stream into successive blocks of the same size (in the order of ten data bits) while the use of frames leads to division of the digital bit stream into consecutive sequences of exactly the same size (this size is relatively large and can be as much as several hundred data bits or more), each marked by a special configuration of bits in the same form as the data, called the frame alignment word. The frame alignment words are either localized or distributed. The division of the digital bit stream into blocks is compatible with its division into frames in the sense in that the length of a frame is a multiple of that of a block, a frame comprising several dozen consecutive blocks, and in the sense that the frame alignment words all have the same position relative to the block boundaries.

Frame synchronization consists in synchronizing a frame timebase generating a frame timing signal to the received frame alignment words. One common way of achieving this consists in systematically searching the received digital bit stream for a configuration identical to that of a frame alignment word and regarding this as a true frame alignment word provided that it repeats in the received digital bit stream with the same period as a frame. A disadvantage of this method is that whenever frame synchronization is lost a relatively slow resynchronization process results if there is a high probability that the frame alignment words will be imitated by the data.

To combat this slowness of the resynchronization process without using excessively long synchronization words it is known, especially from U.S. Pat. No. 4,316,284, to introduce into each frame a cyclic code word which changes from frame to frame in a known way to enable a posteriori verification of frame synchronization. The configuration of this cyclic code word is variable from one frame to another and is very unlikely to be imitated by the data, and this makes it possible to detect incorrect synchronization very quickly, virtually within the duration of one frame, and to abandon the process without waiting for a new attempt to synchronize on the next alignment word configuration detected in the received digital bit stream. This avoids synchronizing on imitation alignment words in several consecutive frames.

In the case of a synchronous digital bit stream divided into blocks by a block code and structured in frames marked by alignment words it is also known to verify frame synchronization a posteriori by testing the transmission error rate detected by means of the block code, this error rate having to remain low (below a particular threshold) during each frame if the word regarded as the frame alignment word conforms to the specific position that the latter should have relative to the blocks defined by the code.

An object of the present invention is to accelerate the frame resynchronization process in the case of a synchronous digital bit stream divided into blocks by a block code and structured in frames, and consequently to reduce loss of information during frame resynchronization.

SUMMARY OF THE INVENTION

The present invention consists in a frame synchronization device for a synchronous digital bit stream divided into blocks by means of a block code and structured in frames marked by alignment words, comprising an alignment word configuration recognition circuit adapted to operate on the digital bit stream and to generate a recognition signal on each recognized configuration and a frame timebase adapted to deliver a clock signal at the frame timing rate, a block recognition circuit adapted to mark in the digital bit stream possible locations of transitions between data blocks, a block timebase adapted to deliver a block clock signal at the block timing rate, a circuit for synchronizing said block timebase controlled by said block recognition circuit, a time window definition circuit adapted to produce from the signals from said block timebase and said frame timebase at the timing rate of said block clock or of said frame clock alignment word configuration search time windows occupying relative to said blocks the same position as a configuration recognition signal sent by said configuration recognition circuit for a true alignment word, an alignment word configuration selection circuit adapted to operate under the control of said alignment word configuration recognition circuit and said time window definition circuit and to select configuration recognition signals coinciding with said configuration search time windows, and an alignment word acquisition control circuit adapted to operate under the control of said configuration selection circuit and which, in the absence of alignment word configuration selection over multiple consecutive frames, commands said time window definition circuit to generate time windows at the block clock timing rate and which immediately alignment word configuration selection is recognized synchronizes said frame timebase to the occurrence of the selected configuration and commands said time window definition circuit to generate time windows at the frame clock timing rate.

When frame synchronization is not established this device attempts resynchronization only on alignment word configurations in the digital bit stream that are correctly positioned relative to the blocks, which eliminates most imitations and speeds up significantly the resynchronization process. Once synchronization is established the device verifies that it is maintained by verifying that the alignment word configuration detected in the digital bit stream and selected as the alignment word is repeated with the same period as the frames, the timing rate of the configuration search time windows changing from the block timing rate to the frame timing rate.

The frame timebase advantageously operates on the block clock signal and the alignment word acquisition control circuit advantageously controls the circuit for synchronizing the block timebase so as to enable it in the absence of alignment word configuration selection over multiple successive frames and to disable it as soon as alignment word configuration selection is recognized over multiple successive frames. This makes it possible, when frame synchronization is established, to allow the block timebase to run freely and consequently the frame timebase to run freely without synchronization to the block structure of the digital bit stream, which could be disrupted by transmission errors and which could eventually lead to loss of frame alignment.

Other characteristics and advantages of the invention will emerge from the following description of one embodiment given by way of example. This description will be given with reference to the drawings.

DESCRIPTION OF THE PREFERRED EMBODIMENT

Figure 1:
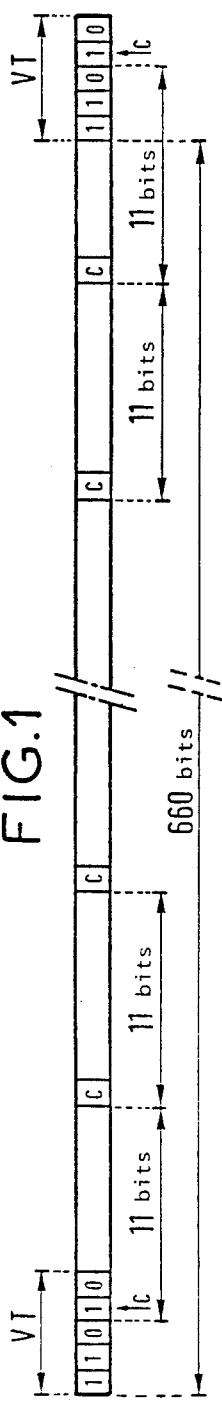
FIG. 1 shows the composition of a synchronous binary digital bit stream divided into blocks by means of a block code and structured in frames each marked by an alignment word.

The synchronous binary digital bit stream shown in FIG. 1 is encoded using a 10B1C type block transmission code and structured into frames of 660 bits with localized alignment words.

The 10B1C block transmission code groups information bits into ten-bit words and adds at the end of each word an insertion bit C the value of which is complementary to that of the information bit immediately preceding it, to produce blocks of eleven bits. It guarantees the presence in the digital bit stream of at least one transition every eleven bits, which is sufficient for synchronizing an oscillator recovering the digital bit stream bit timing.

Each frame comprises exactly sixty successive blocks of eleven bits resulting from the 10B1C transmission coding and begins with a localized alignment word VT having the binary configuration 11010 in which the fourth bit at one is an insertion bit C.

Figure 2:
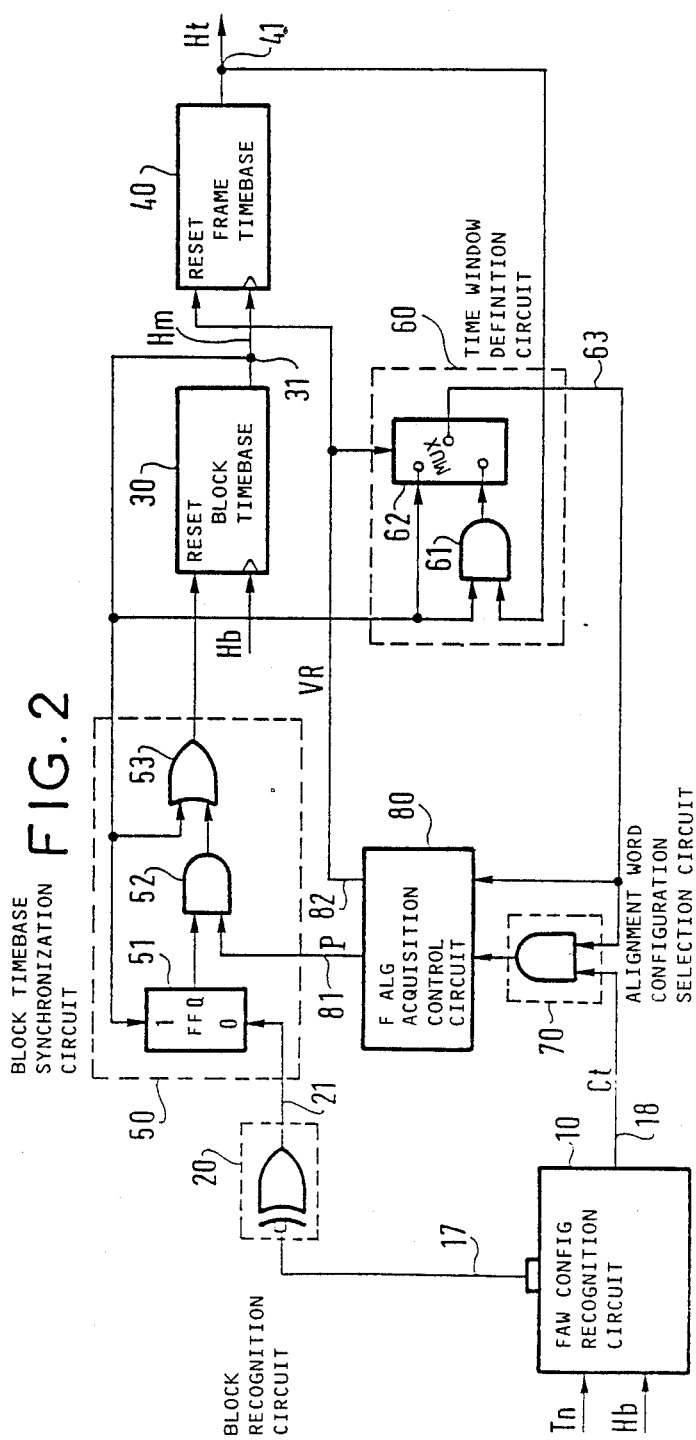
FIG. 2 is a block schematic of a frame alignment device in accordance with the invention suitable for the digital bit stream shown in FIG. 1.

The frame synchronization device of which a block schematic is shown in FIG. 2 matches the structure of the synchronous binary digital bit stream that has just been described. It essentially comprises:

a frame alignment configuration recognition circuit 10 which operates on the received synchronous digital bit stream Tn using a recovered bit clock signal Hb, a block recognition circuit 20 which operates on the received synchronous digital bit stream Tn as it passes through the word configuration recognition circuit and which determines possible locations of transitions between blocks of data, a block timebase 30 receiving the recovered bit clock Hb and supplying a block clock signal Hm the period of which is equal to the duration of a data block, a frame timebase 40 operating on the recovered bit clock signal Hb divided down by the block timebase 30 and supplying a frame clock signal Ht the period of which is equal to the duration of a frame, a circuit 50 for synchronizing the block timebase 30 controlled by the block recognition circuit 20 and enabled or disabled by a frame alignment acquisition control circuit 80, a time window definition circuit 60 producing from the block clock signal Hm or the frame clock signal Ht from the block timebase 30 or the frame timebase 40 alignment configuration search time windows at the block timing rate or at the frame timing rate, the timing rate being chosen by the frame alignment acquisition control circuit 80, an alignment word configuration selection circuit 70 operating under the control of the frame alignment word configuration recognition circuit 10 and the time window definition circuit 60, and the aforementioned frame alignment acquisition control circuit 80 which is connected to the output of the alignment word configuration selection circuit 70 and which controls the circuit 50 for synchronizing the block timebase 30 and the time window definition circuit 60.

Figure 3:
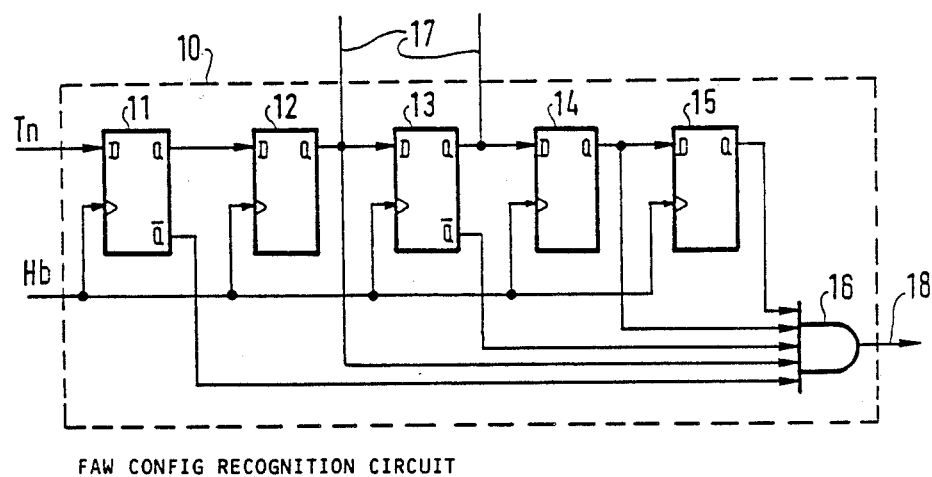
FIG. 3 shows in detail the schematic of a frame alignment word configuration recognition circuit from the block schematic of FIG. 2.

The frame alignment word configuration recognition circuit 10 is shown in detail in FIG. 3. It comprises a shift register with five stages 11 through 15 and a five-input AND gate 16. The shift register receives at its input the received synchronous binary digital bit stream Tn. Its stages 11 through 15 change state between the bit intervals of the received digital bit stream. They are timed by the bit clock signal Hb recovered by means of an oscillator (not shown) phase-locked to the transitions between data bits of the received digital bit stream Tn. The AND gate 16 has its five inputs connected to appropriate complemented or direct outputs of the five stages 11 through 15 of the shift register to identify the logical values configuration 11010 of a frame alignment word VT. It generates an alignment word configuration recognition binary signal Ct which goes to logic 1 in a bit time interval in which said configuration is recognized while at other times it remains at logic 0, the signal Ct being delivered on an output 18 of the circuit 10. An auxiliary two-wire output 17 of the circuit 10 provides access to the direct outputs of the second and third stages 12 and 13 of the shift register for the block recognition circuit 20.

As shown in FIG. 2, the block recognition circuit 20 comprises a two-input exclusive-OR gate. It supplies at its output 21 a binary signal which goes to logic 1 in each bit time interval of the digital bit stream in which two consecutive data bits of different value are written into the second and third stages 12 and 13 of the shift register of the frame alignment word configuration recognition circuit 10. This occurs (note that it also occurs at other times) in each bit time interval of the digital bit stream in which an insertion bit C of the 10B1C code is written into the second stage 12 of the shift register of the frame alignment word configuration recognition circuit 10, in particular during each bit time interval of the digital bit stream in which the frame alignment word configuration recognition circuit 10 detects the configuration of a true frame synchronization word and generates a configuration recognition signal Ct at logic 1.

The block timebase 30 is a counter with synchronous reset to zero having an output 31 representing the count state 10 looped to its reset to zero input so that it counts through cycles of eleven states. This counter is incremented by the bit clock signal Hb and the count state changes between the bit intervals of the received digital bit stream Tn. The counter delivers on its output 31 a block clock binary signal Hm which goes to logic 1 for the count state 10 and remains at logic 0 for all the other count states.

The circuit 50 for synchronizing the block timebase 30 controls the loop between the output and the reset to zero input of the counter of the block timebase 30. It enables unconditionally repetitive counting cycles through eleven states or renders the repetition of the counting cycles through eleven states dependent on the output state of the block recognition circuit 20, according to whether frame alignment is regarded as acquired or lost by the frame alignment acquisition control circuit 80. To this end, as shown in FIG. 2, it comprises an RS type flip-flop 51, a two-input AND gate 52 and a two-input OR gate 53. The RS flip-flop 51 has a reset to zero input that takes precedence over its reset to one input. Its reset to zero input is connected to the output 21 of the block recognition circuit 20 and its reset to one input is connected to the output 31 of the block timebase 30.

One input of the AND gate 52 is connected to the output of the RS flip-flop 51 and the other input is connected to an output 81 of the frame alignment acquisition control circuit 80. One input of the OR gate 53 is connected to the output of the AND gate 52 and the other input is connected to the output 31 of the block timebase 30.

The circuit 50 for synchronizing the block timebase 30 is respectively enabled or disabled by a loss of alignment binary signal P at logic 1 or 0 generated by the frame alignment acquisition control circuit 80 on its output 81.

A loss of alignment binary signal P at logic 0 signifies acquisition of frame alignment and disables the circuit 50 for synchronizing the block timebase 30 because it results in a logic 0 at the output of the AND gate 52 which enables permanent loopback by the OR gate 53 between the output and the reset to zero input of the counter of the block timebase 30. The counter of the block timebase 30 then counts freely through repetitive cycles of eleven states.

A loss of alignment binary signal P at logic 1 signifies loss of frame alignment and enables the circuit 50 for synchronizing the block timebase 30. As a result the output of the AND gate 52 copies the state at the output of the RS flip-flop 51 which controls the loopback by the OR gate 53 between the output and the reset to zero input of the counter of the block timebase 30. When at logic 1 the RS flip-flop 51 suspends the loopback and holds the counter of the block timebase 30 at count state 0. At logic 1 it enables the loopback and operation of the counter of the block timebase 30. Each time the counter of the block timebase 30 goes through the count state 10 the RS flip-flop 51 is set to logic 1 if it does not simultaneously receive a higher priority reset to zero instruction from the block recognition circuit 20. The effect of this is to lock the counter of the block timebase 30 at count state 0 at the start of each new counting cycle through eleven states if an insertion bit of the 10B1C code has not been detected by the block recognition circuit 20 while the counter was at count state 10, and to maintain such locking until an insertion bit C is detected. The RS flip-flop 51 makes it possible to synchronize the count state 10 of the counter of the block timebase 30 to detection in the digital bit stream of insertion bits C of the 10B1C code at the second stage 12 of the shift register of the alignment word configuration recognition circuit 10 or when the alignment word configuration recognition signal Ct goes to logic 1, which corresponds either to true alignment words or to imitation alignment words having the same position as the latter relative to the blocks.

The frame timebase 40 comprises a counter with a capacity of sixty and asynchronous reset to zero incremented on the rising edges of its clock signal. The count input of this counter is connected to the output 31 of the block timebase 30 and its reset to zero input is connected to an output 82 of the frame alignment acquisition control circuit 80. It receives by way of counting signal the block clock signal Hm and produces at its output 41 a frame clock signal Ht consisting of a binary signal which goes to logic 1 for the count state 0 and remains at logic 0 for all other count states.

The counter of the frame timebase 40 counts the sixty blocks of 10B1C code included in each frame. It is reset to zero for synchronizing the frame clock Ht by a "seek frame alignment" binary signal VR supplied by the frame alignment acquisition control circuit 80 on its output 82. The signal VR goes to logic 1 and holds the counter of the frame timebase 40 in the count state 0 if frame alignment is regarded as lost and no alignment word configuration in the digital bit stream has yet been selected by the device. It returns to logic 0 as soon as the device has detected in the digital bit stream a frame alignment word configuration and has selected this as a true alignment word to synchronize the count state 0 of the counter of the frame timebase 40 with the appearance in the digital bit stream of the first alignment word configuration selected as a true alignment word.

The time window definition circuit 60 defines alignment word configuration search time windows which have a duration equal to the bit time interval of the digital bit stream and appear either at the block timing rate or at the frame timing rate, depending on the value of the signal VR generated by the frame alignment acquisition control circuit 80 and which occupies bit time intervals of the digital bit stream having the same position relative to the blocks as the logic 1 states of the configuration recognition signal Ct due to the occurrence of true alignment words in the digital bit stream. It includes a two-input AND gate 61 with one input connected to the output 31 of the block timebase 30 and the other input connected to the output 41 of the frame timebase 40 and a multiplexer circuit 62 with two data inputs of which one is connected to the output 31 of the block timebase 30 and the other is connected to the output of the AND gate 61. Its addressing input is connected to the output 82 of the frame alignment acquisition control circuit 80, the output of the multiplexer 62 constituting the output 63 of the time window definition circuit 60.

A logic 1 value of the "seek frame alignment" signal VR causes the multiplexer 62 to select its data input connected direct to the output 31 of the block timebase 30 and a logic 0 value causes the multiplexer 62 to select its input connected to the output of the AND gate 61. Because of this, the time window definition circuit 60 selects from the pulses of the block clock signal Hm those which correspond to the count state 10 of the counter of the block timebase 30 during which the configuration recognition signal Ct always goes to logic 1 (the signal Ct is that generated by the frame alignment word configuration recognition circuit 10 on detection of true alignment words or imitations in the same positions as the latter relative to the blocks). This selection is either total, in which case all the pulses of the block clock signal Hm are selected when the "seek frame alignment" signal VR is at logic 1 signifying that frame alignment is lost and that no alignment word configuration has yet been selected by the device, or partial, in which case only the pulses of the block clock signal Hm coincident with the pulses of the frame clock signal Ht are selected if the signal VR is at logic 0 signifying that an alignment word configuration has already been selected by the device as the alignment word for the current frame.

As shown in FIG. 2, the alignment word configuration selection circuit 70 comprises a two-input AND gate with one input connected to the output 18 of the alignment word configuration recognition circuit 10 and the other input connected to the output 63 of the time window definition circuit 60. At the output from the frame alignment word configuration recognition circuit 10, it sorts the logic 1 states of the configuration recognition signals Ct and selects only those due to true alignment words or imitation alignment words at the same positions as true alignment words relative to the blocks, either systematically if frame alignment is lost and no frame alignment word configuration has yet been selected, or with the same period as the frames if frame alignment is considered to be acquired. Most false synchronizations are eliminated by virtue of this sorting applied to the recognized frame alignment word configurations. With the digital bit stream adopted for the sake of this example, there are on average around 20 imitations of the frame alignment word configuration equally distributed relative to the blocks. Without the proposed sorting the alignment word search extends in a frame over 660 five-bit words and requires eleven frames for locking on a true alignment word with a probability better than 99/100. With the proposed sorting the alignment word search extends over only 60 five-bit words correctly placed relative to the blocks and requires only two frames to lock onto a true alignment word with a probability better than 99/100.

Figure 4:
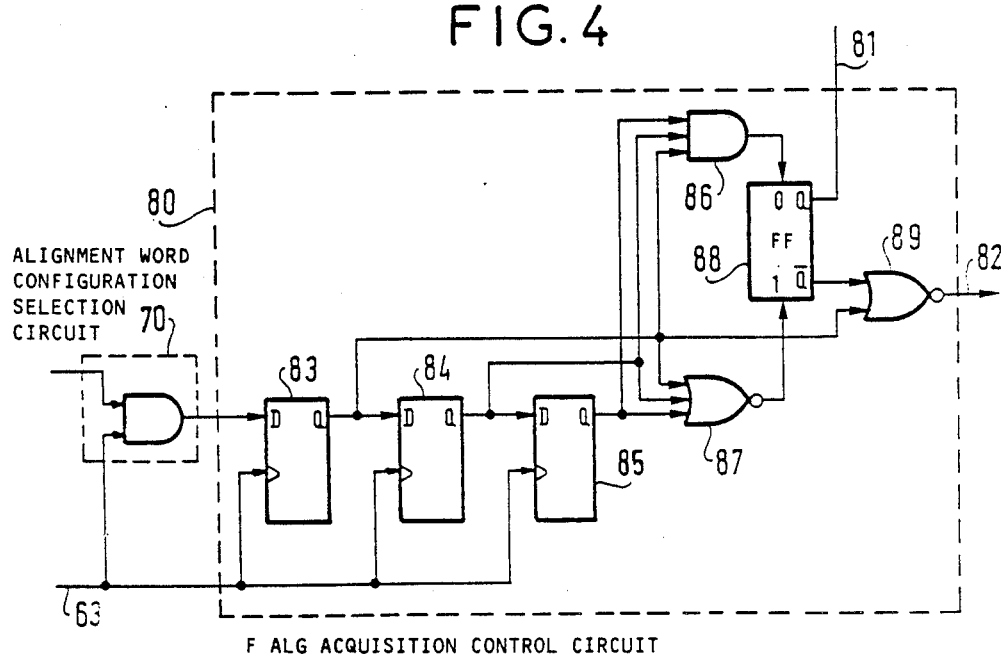
FIG. 4 shows in detail the schematic of a frame alignment acquisition control circuit also from the block schematic of FIG. 2.

As previously mentioned, the role of the frame alignment acquisition control circuit 80 is to generate the loss of alignment binary signal P and the "seek frame alignment" signal VR. It decides whether frame alignment is respectively lost or acquired as soon as the alignment words of three consecutive frames have not been or have been recognized. As shown in FIG. 4, it comprises a three-stage shift register with its data input connected to the output of the alignment word configuration selection circuit 70 and its clock input connected to the output 63 of the window definition circuit 60, a three-input AND gate 86, a three-input NOR gate 87 the inputs of which are connected to the direct outputs of the three stages 83, 84 and 85 of the shift register, an RS type flip-flop 88 with its reset to zero input connected to the output of the AND gate 86 and its reset to one input connected to the output of the NOR gate 87, and a two-input NOR gate 89 with one input connected to the direct output of the first stage 83 of the shift register and the other input connected to the complemented output of the RS flip-flop 88.

The three stages 83, 84, 85 of the shift register are written at the end of each time window defined by the time window definition circuit 60, the first stage 83 going to logic 1 if a frame alignment word configuration is recognized in the time window preceding its writing, or to logic 0 otherwise.

The AND gate 86 causes the RS flip-flop 88 to go to logic 0 if the three stages 83, 84, 85 of the shift register go to logic 1, indicating the detection of an alignment word configuration in three consecutive time windows, which constitutes a frame alignment acquisition criterion.

The NOR gate 87 causes the RS flip-flop 88 to go to logic 1 if the three stages 83, 84, 85 of the shift register go to logic 0, indicating non-detection of an alignment word configuration over three consecutive time windows, which constitutes a loss of frame alignment criterion.

The state of the RS flip-flop 88 memorizes the last frame alignment acquisition or loss criterion to be verified. The loss of alignment binary signal P is taken from its direct output Q.

The NOR gate 89 generates the "seek frame alignment" binary signal VR, its output going to logic 1 if the RS flip-flop 88 is at logic 1 signifying loss of frame alignment and the first stage 83 of the shift register is at logic 0 signifying that an alignment word configuration has not been recognized in the last time window.

The device which has just been described has three distinct phases of operation:

a first phase corresponding to loss of frame alignment, the frame alignment word having not been recognized over three consecutive frames, in which the last frame alignment recognition dates back more than one frame, the block timebase 30 is synchronized continuously to the digital bit stream by the block recognition circuit 20, the frame timebase 40 is disabled pending recognition of the first frame alignment word configuration, and the time window definition circuit 60 defines configuration search time windows at the timing rate of the data blocks, a second phase also corresponding to loss of frame alignment but in which the last recognition of a frame alignment word does not date back more than one frame, the block timebase 30 is still synchronized continuously to the digital bit stream by the block recognition circuit 20, the frame timebase 40 is enabled from recognition of the alignment word, and the time window definition circuit defines configuration search time windows at the frame timing rate, and a third phase corresponding to frame alignment acquisition, a frame alignment word having been recognized in three consecutive frames and having since then been recognized in at least one frame in three, during which third phase the block timebase 30 is no longer synchronized to the digital bit stream by the block recognition circuit 20 but is free-running to avoid loss of synchronization on false data bits resulting from transmission errors, the frame timebase remains enabled and the time window definition circuit continues to define configuration search time windows at the frame timing rate.

Some arrangements may be modified and some means may be replaced with equivalent means without departing from the scope of the invention. In particular, the frame alignment word configuration recognition circuit could be modified to adapt it to a distributed alignment word, for example by using a shift register with a sufficient number of stages to contain the frame portion over which an alignment word extends and using an appropriate selection of the register stage outputs or, if the distributed alignment word has bits with a common position in the blocks relative to the insertion bit C, using a shift register clocked by a version of the block clock appropriately phase-shifted and of sufficient length to contain all the bits of the alignment word given its writing rate, the insertion bit being detected by means of a specific two-stage register written at the bit timing rate.

There is claimed:

1. A frame synchronization device for a synchronous digital bit stream divided into data blocks at a block timing rate by means of a block code and structured in frames occurring at a frame timing rate marked by alignment words having a predetermined configuration, said device comprising:

- an alignment word configuration recognition circuit for detecting said predetermined configuration in said digital bit stream and for generating a configuration recognition signal each time said predetermined configuration is detected,
- a frame timebase for delivering a clock signal at the frame timing rate,
- a block recognition circuit for generating block recognition signals corresponding to possible locations in the digital bit stream of transitions between data blocks,
- a block timebase for delivering a block clock signal at the block timing rate,
- a synchronizing circuit responsive to said block recognition signals for synchronizing said block timebase,
- a time window definition circuit responsive to signals from said block timebase and said frame timebase for producing time window signals defining alignment word configuration search time windows occupying positions relative to said blocks which correspond to the position of a configuration recognition signal sent by said configuration recognition circuit upon detecting an alignment word,
- an alignment word configuration selection circuit responsive to configuration signals from said alignment word configuration recognition circuit and responsive to said time window signals for selecting configuration recognition signals coinciding with said configuration search time windows, and
- an alignment word acquisition control circuit responsive to an output of said configuration selection circuit for causing said time window definition circuit to generate time windows at the block clock timing rate in the absence of selection signal output over multiple consecutive frames, and which, upon the occurrence of a selection signal output synchronizes said frame timebase to the occurrence of the selected configuration and commands said time window definition circuit to generate time window signals at the frame clock timing rate.

2. A device according to claim 1 wherein said frame timebase is responsive to said block clock signal supplied by said block timebase and wherein said circuit for synchronizing said block timebase is enabled by said alignment word acquisition control circuit in the absence of a selection signal output over multiple consecutive frames and is disabled by said alignment word acquisition control circuit immediately upon the occurrence of a selection signal output over multiple consecutive frames.

* * * * *